United States Patent [19]

Hurst

[11] 4,051,934

[45] Oct. 4, 1977

[54] BIDIRECTIONAL DRIVE COUPLING

[75] Inventor: John W. Hurst, Port Huron, Mich.

[73] Assignee: Chrysler Corporation, Highland Park, Mich.

[21] Appl. No.: 679,529

[22] Filed: Apr. 23, 1976

[51] Int. Cl.² .................. F16D 43/21; F16D 13/28
[52] U.S. Cl. .................. 192/21; 192/48.91;
192/54; 192/65; 192/93 A; 192/113 R
[58] Field of Search .............. 192/21, 48.91, 50, 65,
192/54, 113 R, 93 A

[56] References Cited

U.S. PATENT DOCUMENTS

| 3,901,361 | 8/1975 | Brownlie | 192/21 |
| 3,946,841 | 3/1976 | La Follette | 192/21 |
| 3,977,503 | 8/1976 | Hurst | 192/54 |

Primary Examiner—Allan D. Herrmann
Attorney, Agent, or Firm—Talburtt & Baldwin

[57] ABSTRACT

Corresponding sets of radially distributed helical surfaces in a drive coupling for axially urging either of two female cone members into positive engagement with a male cone member and providing a selectively bidirectional rotary output.

19 Claims, 13 Drawing Figures

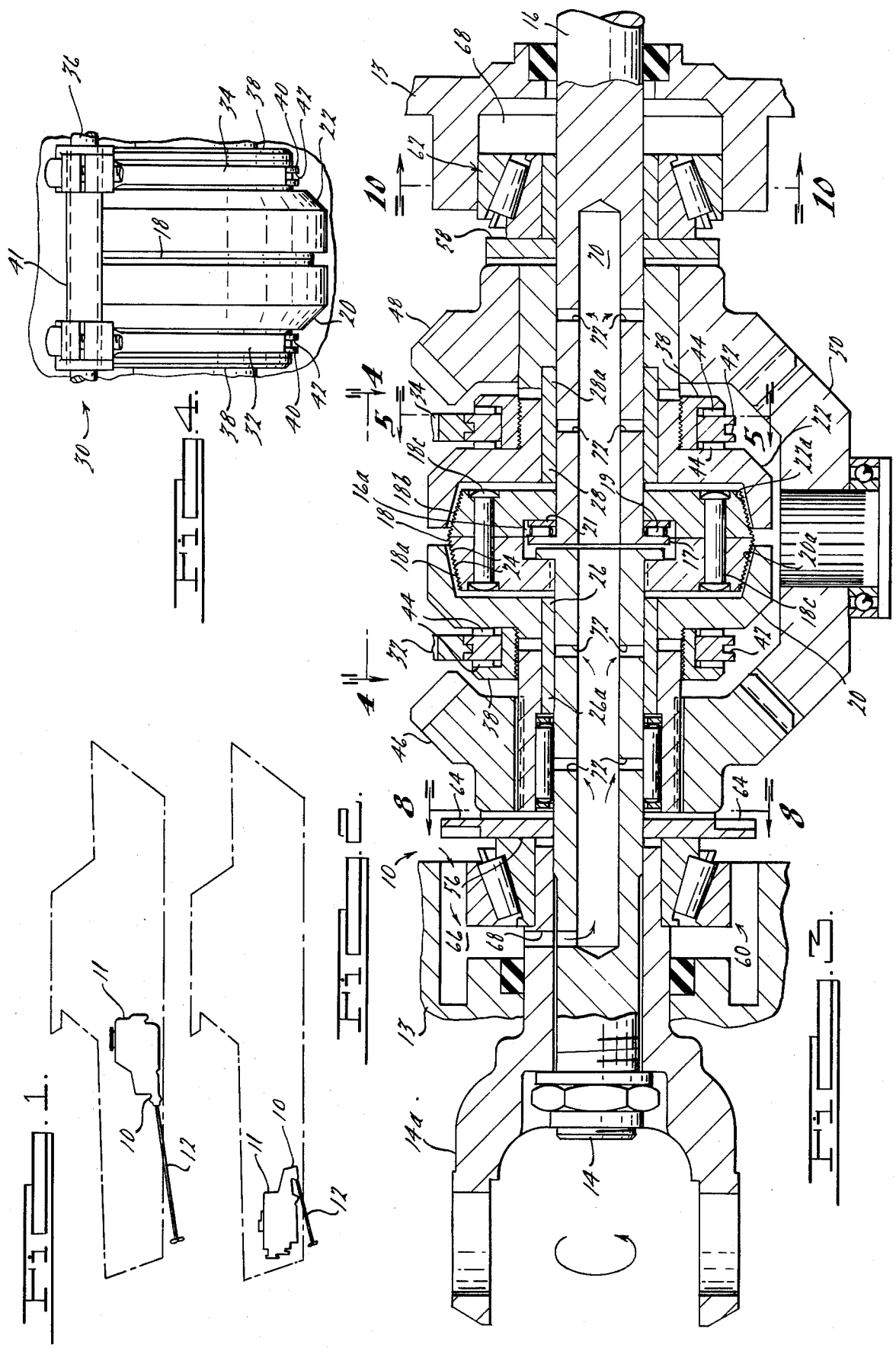

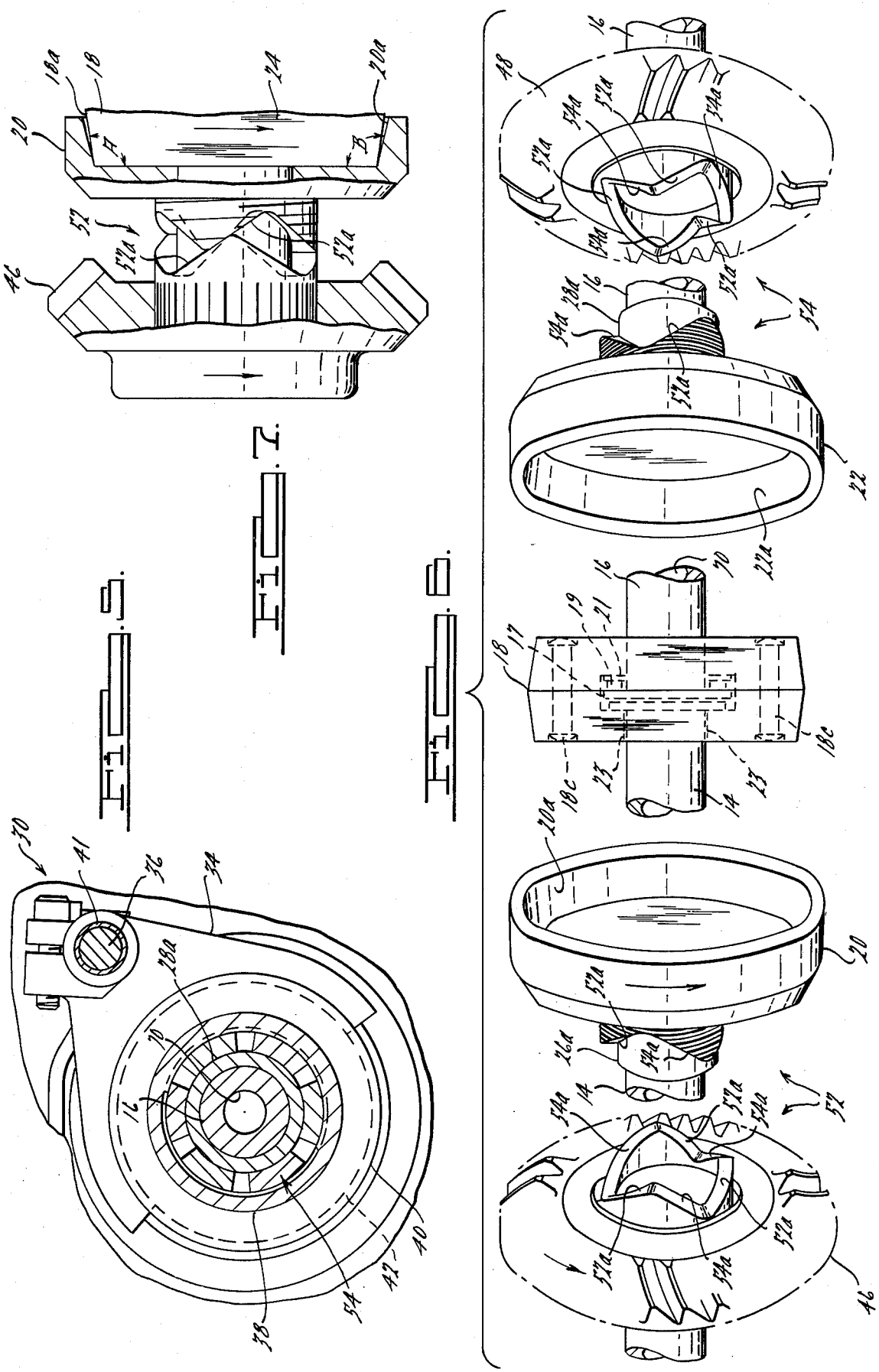

BIDIRECTIONAL DRIVE COUPLING

BACKGROUND OF THE INVENTION

The invention relates to bidirectional drive couplings and more particularly to reversing gears or clutches. In its preferred forms it comprises a cone clutch or reversing clutch for inboard marine engine installations.

Related co-pending applications are Ser. No. 598,313 filed July 23, 1975 entitled "Clutch," now U.S. Pat. No. 3,977,503, and an application filed of even date herewith entitled "Drive Couplings and Clutches."

SUMMARY OF THE INVENTION

In the preferred embodiment of this invention two sets of female cone-gear pairs each have corresponding radially distributed helical camming surfaces carried on abutting end portions of each gear and axially movable female cone pair. The abutting end portions of each cone-gear pair are in axial overlapping relationship whereby the camming surfaces therebetween drivingly engage each other when the gear or female cone of a cone-gear pair is rotated. Individual female cone rotation is initiated by axial movement thereof into engagement with a single rotatable male cone carried on and rotated by an input shaft and positioned axially between the two female cones. Upon rotation of one of the female cones by the male cone, driving engagement of the axially overlapping helical cam surfaces of the female cone and its mated gear occurs whereby the gear is rotated to provide rotation of an output shaft. One of the cone-gear pairs is carried on the input shaft. The other cone-gear pair is carried on the output shaft.

THE DRAWINGS

FIGS. 1 and 2 are schematic showings of a drive coupling of the invention in its preferred marine use in two forms; an inline-drive inboard engine arrangement in FIG. 1 and a V-drive inboard engine arrangement in FIG. 2.

FIG. 3 is a side elevational view in section of a preferred drive coupling embodiment showing various features of the invention.

FIG. 4 is a fragmentary plan view of an upper portion of FIG. 3 taken from line 4—4 in FIG. 3.

FIG. 5 is a fragmentary sectional view taken along line 5—5 of FIG. 3.

FIG. 6 is an exploded detail perspective view of a part of FIG. 3 showing the female cone-gear pairs and the male cone and the helical surfaces on abutting end portions of the cone-gear pairs.

FIG. 7 is a fragmentary sectional view of part of FIG. 3 showing the helical surfaces of a gear and female cone in driving engagement and the conical surfaces of female and male cones in driving engagement.

PREFERRED EMBODIMENTS

FIGS. 1 – 10

Figure 10:
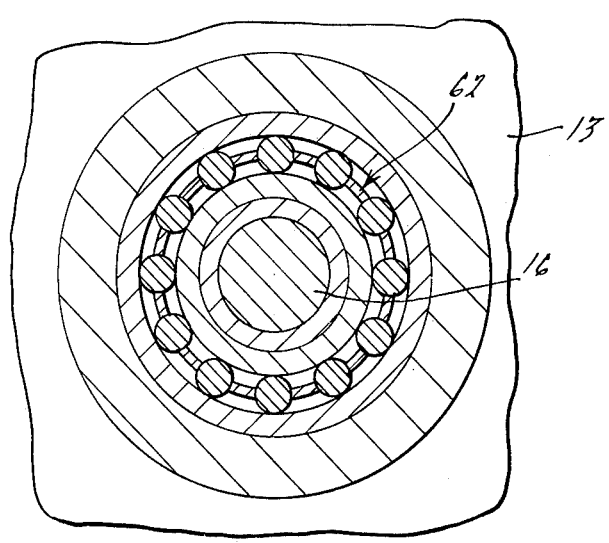
FIG. 10 is a fragmentary sectional view taken along line 10—10 of FIG. 3.

In FIG. 1, the inboard engine 11 and drive shaft 12 to the propeller comprises an inline marine drive arrangement. The output shaft of the engine is connected to drive shaft 12 by driving through a bidirectional coupling or clutch 10 which is often times also referred to as a reverse or reversing gear. Actually, it may be regarded as a clutch which is capable of neutralizing the rotary output of the engine output shaft so that drive shaft 12 is immobile even if the engine is running. Clutch 10 is also capable of providing rotation of the drive shaft in either the same direction as the engine rotational output or in the reverse direction as described below in detail.

Clutch or coupling 10 is shown in detail in FIG. 3 in a preferred form. In the inline arrangement of FIG. 1, the output shaft of engine 10 is connected to drive shaft 12 through coupling 10.

FIG. 2 shows a V-drive arrangement which is sometimes desirable for connecting an inboard engine 11 to the propeller drive shaft 12. In this arrangement, the engine output shaft extends forward in the boat while the propeller drive shaft extends aft below the engine. Suitable gearing (not shown) is provided in coupling 10 to drivingly interconnect the engine to the driveshaft. For example, a gear (not shown) may be attached to the engine output shaft. Another gear (not shown) may be attached to the input shaft 16 of coupling 10 and the two gears arranged to intermesh one above the other, with the output shaft 16 of coupling 10 pointing aft in the board coaxially with and connected to the propeller drive shaft.

Output shaft 16 as shown in FIG. 3 is positioned end to end coaxial with input shaft 14. In the preferred form, its end is received into male cone 18 in a recess therein and the end is provided with a head 17 which fits into the recess of cone 18 as shown in FIGS. 3 and 6 to maintain the end of the output shaft 16 in a fixed spatial relationship with male cone member 18 and input shaft 14. In such an arrangement, male cone 18 is free to rotate independently of output shaft 16 and output shaft 16 is free to rotate independently of male cone 18. To facilitate such relative rotation a set of needle bearings 19 and a thrust washer 21 are included in the unit. To facilitate assembly, male cone member 18 is made in two half portions which are held together as by rivets 18c or the like. The half portion of the male cone member on shaft 14 is splined thereto as shown at 23.

As is conventional in coupling units such as clutch 10, its input shaft 14 is adapted as at 14a in FIG. 3 and as previously described, for connection to the output shaft of an engine whereby input shaft 14 may be rotated to drive a propeller carried on a propeller drive shaft 12. Input shaft 14 and output shaft 16 of clutch 10 carry various clutch members which coact in combination to provide a reversible rotary output to the coupling output shaft 16 in order to drive shaft 12 and the propeller.

Referring now to FIGS. 3 – 10, specifically, fixed or integral to the end of input shaft 14 and rotatable therewith is the first drive member or male cone member 18 having opposing frusto-conical convex faces 18a and 18b. To one side of male cone member 18, shaft 14 carries a second drive member of female cone member 20. To the other side, on output shaft 16, a third drive member or female cone member 22 is carried. The female cones have frusto-conical concave interior rim portions or faces 20a and 22a, respectively. Female cone member 20 is mounted on shaft 14 so that it may rotate freely thereon and also be axially movable thereon over a range of travel toward and away from male cone member 18. Female cone member 22 is similarly mounted on output shaft 16. This arrangement provides a coupling or cone clutch wherein the second and third drive members 20 and 22 are oppositely coned female clutch members and the first drive member 18 is a mating coned male clutch member.

As is the case with many clutches, this one is preferably carried inside a housing 13 which contains a substantial amount of oil. For example, the clutch members may be partially or wholly immersed in lubricating oil. It is therefore preferred that either the rim portions of 20a and 22a or the face portions 18a and 18b of member 18, as shown in FIGS. 3 and 7, be provided with a plurality of small grooves 24 arranged to wipe oil from therebetween when any of the surface portions of these members come into mutual contact during operation of the clutch. This may be further understood as to purpose and arrangement by having reference to the teaching set forth in the Society of Automotive engineers paper No. 311B entitled *Automatic Transmission Friction Elements* by Froslie, Milek and Smith, which was delivered at the SAE meeting of Jan. 9-13, 1964, with particular reference to pp. 2-3 thereof.

To provide stable axial movement for female cone members 20 and 22, they are each fixed to a bushing 26 and 28 respectively for sliding movement on the shafts which carry them. Each of the bushings includes an extending portion 26a and 28a respectively best illustrated in FIG. 6 which provides for stable sliding movement of each female cone on their respective shafts 14 and 16.

Figure 11:
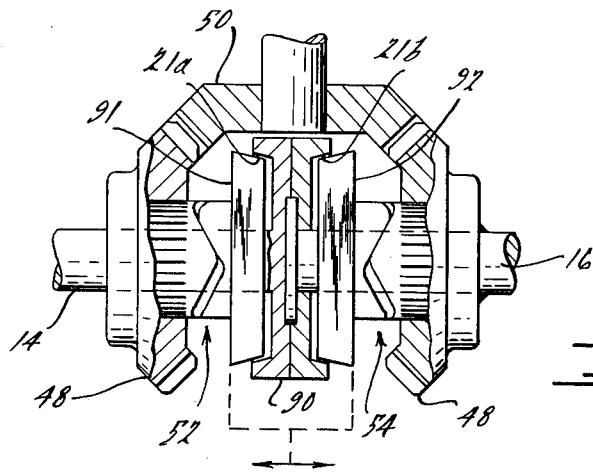
FIG. 11 is an alternate embodiment of a coupling embodying features of the invention and also showing both the helical surfaces of the female cones and gears in a neutral condition and the conical surfaces of the female and male cones in a neutral condition.

Each female cone member 20 and 22 is provided with means generally designated 30, shown in FIGS. 4 and 5, for selectively moving the female cone into and out of contact with the male cone member 18. Preferably, means 30 will take the form of a pair of arcuate fork members 32 and 34 slidably mounted on a rail 36. Each of the fork members is connected to one of the female cones. A preferred arrangement for this connection is shown in the drawing FIGS. 4 and 5 and includes an annular member 38 fitted to each of the female cones as by the screw threads on the extending portion of the cone as shown in FIGS. 3 and 6. Each member 38 carries a ring 40 having an annular groove 42. Ring 40 is positioned between two annularly distributed sets of needle bearings indicated at 44 which facilitates rotation of ring 40 relative to its corresponding female cone member. In addition to decreasing friction between the forks and the clutch members which receive them, the making and breaking of contact between male cone member and the respective female cone member is facilitated with less effort by use of such a bearing arrangement. Means 30 will preferably be designed to provide simultaneous movement of the forks and female cone members as by tying the two forks together for simultaneous movement through a sleeve 41 which slides on rail 36. The forks may be attached to the sleeve by bolts as shown in FIGS. 4 and 5. With such an arrangement both female cones may be readily placed in a neutral condition relative to male cone member 18, as shown in FIGS. 3 and 11. Also, one or the other of the female cones may be selectively brought into contact with male cone member 18 to provide a forward or reverse driving condition. A driving condition is illustrated in FIG. 7 which shows female cone 20 contacting male cone 18 to provide a forward condition (arbitrarily selected) for output shaft 16.

In the embodiment of FIGS. 3-10, the rotation of output shaft 16 is provided by interaction between three gears. One of the gears 46 is carried on input shaft 14 and is free to rotate thereon. The second gear 48 is carried on output shaft 16 and is fixed thereto so that gear 48 and output shaft 16 rotate together. Gears 46 and 48 are substantially axially fixed on their respective shafts, 14 and 16, i.e., slight movement is acceptable such as in the range of 0.010 inch. Rotation of either gear 46 and 48 causes rotation of gear 50 and hence rotation is transmitted between the shafts and gears by gear 50.

In the embodiment shown in FIGS. 3-10, gears 46 and 48 are driven by the respective female cone to which they are adjacent and abut. Each gear is placed on its respective shaft adjacent a side of the respective female cone which is opposite the female cone side to which the male cone is adjacent. In other words, each female cone is positioned between the male cone and one of the rotatable gears 46 and 48.

Interconnection for coaction between the female cone members and their adjacent abutting gear is constantly provided by sets of a plurality of complementary radially distributed overlapping helical camming surfaces, generally designated at 52 and 54, best seen in FIGS. 6 and 7, which are carried on adjacent abutting portions of the female cone-gear pairs 20-46 and 22-48, respectively. The helical surfaces are formed on adjacent portions of the female cone-gear pairs as shown in the form of cylindrical abutting end portions or side portions thereof, 52 and 54 respectively. As shown in FIG. 6, it is preferred that at least three driving or active helical surfaces be provided on each member of each set. However, two per member or more than three are acceptable.

For the embodiment shown in FIGS. 3-10, the spiral direction of the helical surfaces is in an opposite direction for each cone-gear pair 20-46 and 22-48, i.e., the helical surfaces are "opposite handed" to provide proper coaction for opposite directions of rotation of output shaft 16 depending on which cone-gear pair is driving gear 50 and is being driven in turn by male cone 18. As is illustrated in FIG. 7, the helical surfaces may be symmetrical and alternate surfaces may be used to obtain "opposite handedness." Thus, in FIG. 6, helical surfaces 52a on the female cone-gear pair 20-46 would coact to drive gear 50 through gear 46 when cone 20 is engaged with male cone 18; rotation of gear 46 and female cone 20 being in the direction indicated by the arrows. On the other hand, due to the symmetrical arrangement of the surfaces flipping cone 20 and gear 46 through 180° will allow them to function as female cone-gear pair 22-48. In such an instance, the drive action will be through helical surfaces 54a. As shown, the helical surfaces 52a of cone-gear pair 20-46 spiral in one direction; see FIGS. 6 and 7. On the other hand, the helical surfaces 54a of cone-gear pair 22-48 spiral in a second direction.

Since the helical surfaces of each cone-gear pair are constantly overlapping over the entire extent of the axial travel of each female cone, constant driving engagement between each female cone-gear pair is readily provided when the female cone is brought into contact with the rotating male cone 18. Interaction of the helical surfaces upon rotation also provides a positive force which urges the female cone against the male cone to improve the coupling action therebetween.

Figure 8:
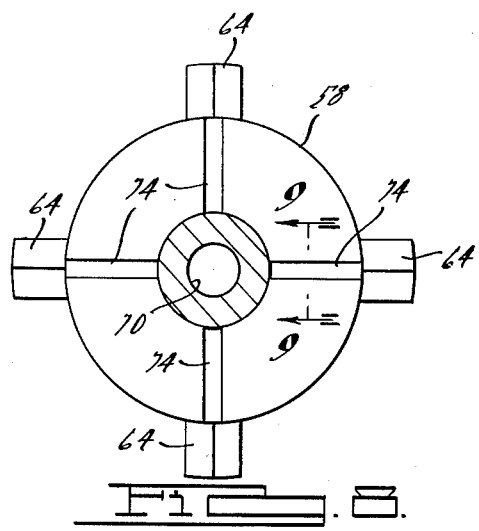
FIG. 8 is a fragmentary sectional view taken along line 8—8 of FIG. 3.
Figure 9:
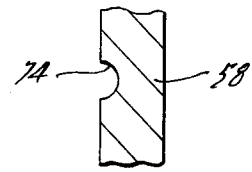
FIG. 9 is a fragmentary sectional view taken along line 9—9 of FIG. 8.

Each of the gears 46 and 48 rests against a thrust washer 56 and 58 on shafts 14 and 16, respectively. The thrust washers in turn rest against a set of bearings and races generally indicated at 60 and 62. The thrust washers are fixed to the shafts and rotate with them. Also, thrust washer 56 is especially adapted to cause circulation of the lubricating oil in which the clutch is operated inside housing 13. The oil is circulated to various clutch members on the shafts by the thrust washer 56. This is accomplished by providing thrust washer 56 with paddle-like extensions 64 which, upon rotation of washer 56, push the oil from housing 13 into cavity 66, through conduits 68 into hollow portion 70 of shaft 14 as indicated by the arrows in FIG. 3. Shafts 14 and 16 and male cone 18 are provided longitudinally with a hollow center portion 70 and also with a plurality of spaced radiating conduits 72 extending therefrom to the outside surface of the shafts for allowing oil to flow from cavity 66 through hollow portion 70 of the shafts and then outwardly to various locations along the shafts to the clutch member as indicated by the arrows in FIG. 3. Various clutch members may also be provided with oil passages 74 as are shown in FIGS. 8 and 9 on thrust washer 58 by way of example.

The clutch described above operates as follows. As is common, the rotary output of an engine is normally in one given direction. Thus, rotation of input shaft 14 will be unidirectional, for example, in the counter-clockwise direction indicated by the arrow in FIG. 3 and viewed from the aft end of the shaft, i.e., the right handed end shown in FIG. 3 at male cone 18. All references to rotation are made from this vantage point in the specification. It follows that male cone 18 will be unidirectional in rotation also and will rotate with input shaft 14 in the same direction. Axial movement of female cone 20 into contact with male cone 18 as shown in FIG. 7 causes rotation of gear 46 through the engaged overlapping helical surfaces 52a and rotation of meshing gear 50 and output shaft 16 in a first rotary direction. During this action, female cone 22 idles on shaft 16.

If female cone 20 is moved away from male cone 18 and female cone 22 is placed in contact with the male cone, rotation of gear 46 occurs in a direction opposite that of previously rotating gear 46 and meshing gear 50 follows in the opposite rotary direction along with gear 46 which idles on input shaft 14.

Engagement and disengagement between the conical surfaces of the female cones and the male cone is facilitated by making the conical angles thereof slightly different to obtain a slight mismatch therebetween. For example, as illustrated in FIG. 7, the angle A of the male cone face 18a is lesser than the angle B of the face 22a of the female cone 22.

FIGS. 11 – 13

Other arrangements of the clutch members are possible. For example, in FIG. 11 the functions of the male and female cone are interchanged so that the drive member 90 attached to input shaft 14 has female cone surfaces 21a and 21b for receiving male drive member 91 and 92 which are axially movable on input shaft 14 and output shaft 16, respectively. Intermeshing gear 50 interconnects gears 46 and 48 which are driven through radially distributed helical camming surfaces 52 and 54 by the axially movable male cone members 91 and 92. A neutral condition may be obtained as before by positioning both male cones away from the female cone drive member 90.

Figure 12:
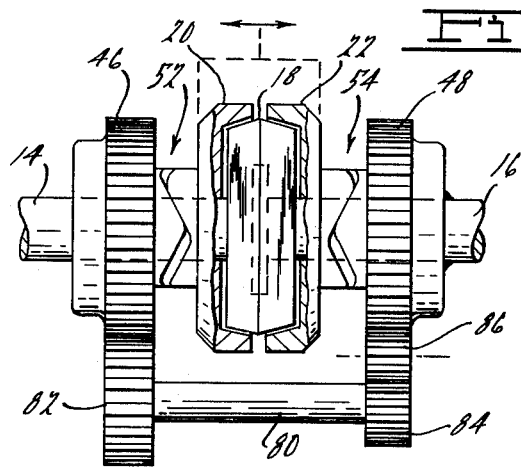
FIG. 12 is another embodiment of the invention in which a lay shaft is used.
Figure 13:
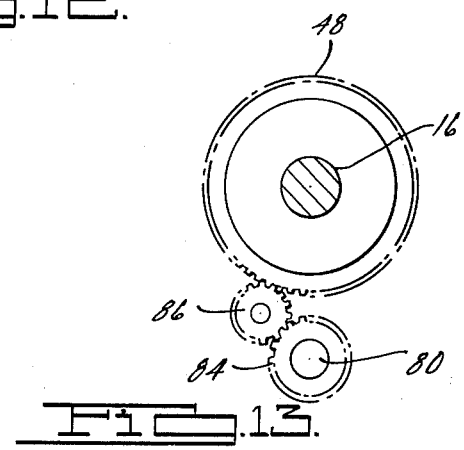
FIG. 13 is an end view of FIG. 12.

Another embodiment is shown in FIGS. 12 and 13 which is similar in structure and operation to FIG. 3 except for the gear means used to interconnect gear 46 and gear 48. In this embodiment, a lay shaft 80 has rotary gears 82 and 84 affixed to each end. Gear 82 meshes with gear 46. Gear 84 meshes with idler gear 86 which meshes with gear 48. Gear 48 is fixed to output shaft 16; gear 46 rotates on input shaft 14.

With the arrangement of FIGS. 12 and 13, unidirectional input shaft 14 drives output shaft 16 in either of two rotating directions when the coupling is operated by axial movement of the drive members 20 or 22. An advantage to this embodiment is that gear sizes may be easily changed to obtain reduction or other mechanical advantages.

What is claimed is:
1. In combination:
 rotatable input and output shafts coaxially positioned in an end-to-end relationship in which the ends are at least proximate to each other;
 a first rotary drive member fixed to the input shaft and coaxially rotatable therewith, the drive member being positioned on the input shaft at least proximate the output shaft;
 second and third rotary drive members positioned to each side of the first drive member, the second drive member being carried on the input shaft and the third drive member being carried on the output shaft, each being axially movable to engage the first drive member, adjacent portions of the first drive member and the second and third drive members being provided with cooperating means for forming a driving-driven relationship when either of the second or third drive members is axially moved into contact with the first drive member thereby causing rotation of the second or third drive member by the first drive member upon its rotation;
 means for selectively placing the second and third drive members into individual contact with the first drive member and for placing both of the second and third drive members out of contact with the first drive member;
 two rotary gears, one gear being adjacent a side of the second drive member opposite the side which contacts the first drive member, and being in a substantially axially fixed position on the input shaft, the other gear being adjacent a side of the third drive member opposite the side which contacts the third drive member, and being substantially axially fixed on the output shaft, the one gear being rotatable on the input shaft and the other gear being fixedly attached to the output shaft for rotation therewith, the gears and second and third drive members forming two drive member-adjacent gear pairs;
 a plurality of complementary, radially distributed, overlapping helical camming surfaces on adjacent portions of the second and third drive members and the gears, the surfaces extending between each drive member-gear pair to drivingly couple them together for rotation, the complementary driving helical surfaces of one drive member-gear pair being opposite handed relative to those of the other drive member-gear pair, the camming surfaces of each pair being in mutual overlapping relationship over the complete range of axial movement of the respective second or third drive members whereby contact and rotation of either the second or third drive member with the first drive member causes rotation of the respective adjacently coupled gear through driving engagement between the corresponding complementary camming surfaces and the driving engagement of the camming surfaces urges the second and third drive member axially toward the drive member for more positive contact therewith while continuing to rotate the adjacent gear, and gear means interconnecting the two rotary gears whereby rotation of the gear on the input shaft causes rotation of the gear on the output shaft.

2. The combination of claim 1 wherein the interconnecting gear means comprises a third rotary gear intermeshing with both the two rotary gears.

3. The combination according to claim 1 wherein the second and third drive members take the form of female cones having a concave side for contacting the first drive member and an opposite side, sliding bushing stabilizer means carrying each female cone on its respective shaft, the bushing extending outwardly a distance from the opposite side of the female cone, the radial helical surfaces being distributed peripherally around the outside diameter of the extending part of the bushing.

4. The combination of claim 1 in which the first drive member contacts the output shaft.

5. The combination of claim 4 in which the first drive member receives the output shaft in a socket.

6. The combination of claim 5 in which the end of the output shaft received in the socket has a head portion and the socket has a recess for receiving the same.

7. The combination of claim 1 wherein the cooperating means of the first drive member and the second and third members are adjacent faces.

8. The combination of claim 7 wherein at least one of the faces includes an arrangement of grooves thereon for improved contact therebetween.

9. The combination of claim 1 as a cone clutch wherein the second and third drive members are oppositely coned female clutch members and the first drive member is a mating cone male clutch member.

10. The combination of claim 9 including means connected to the female cones for selectively axially positioning them.

11. The combination according to claim 9 wherein the cone faces of the male and female cone clutch members are slightly mismatched angularly to facilitate disengagement thereof with lesser effort.

12. The combination according to claim 1 wherein at least one of the shafts is hollow for allowing lubricating oil to flow therethrough and a plurality of radial conduits are distributed over its length for allowing the oil to flow to the exterior thereof for lubricating the various members.

13. The combination according to claim 12 including rotary oil impeller means carried by one of the shafts for circulating oil through the shaft.

14. The combination according to claim 13 wherein the oil impeller means is located near one end of the shaft.

15. The combination according to claim 13 wherein the oil impeller means takes the form of a thrust washer positioned on the shaft adjacent one of the gears and the washer includes a plurality of paddle-like radial extensions whereby rotation of the thrust washer by th shaft causes oil circulation toward one end of the shaft and into its hollow interior.

16. The combination of claim 1 wherein the adjacent portions of the second and third drive members and the gears which provide and carry the helical camming surfaces are cylindrical abutting end portions of the drive members and gears respectively.

17. The combination of claim 16 wherein each end portion has at least two helical camming surfaces formed thereon.

18. The combination of claim 1 wherein the interconnecting gear means comprises a lay shaft having gears at each end thereof, the gear at one end intermeshing with the gear on the input shaft, the gear at the other end being connected to the gear on the output shaft through an idler gear for reverse rotation.

19. The combination of claim 18 wherein the gears are sized relative to each other to provide output rotation which is different from the input rotation.

* * * * *